Aug. 4, 1925.
B. J. JOHNSON
COTTER PIN
Filed June 3, 1925
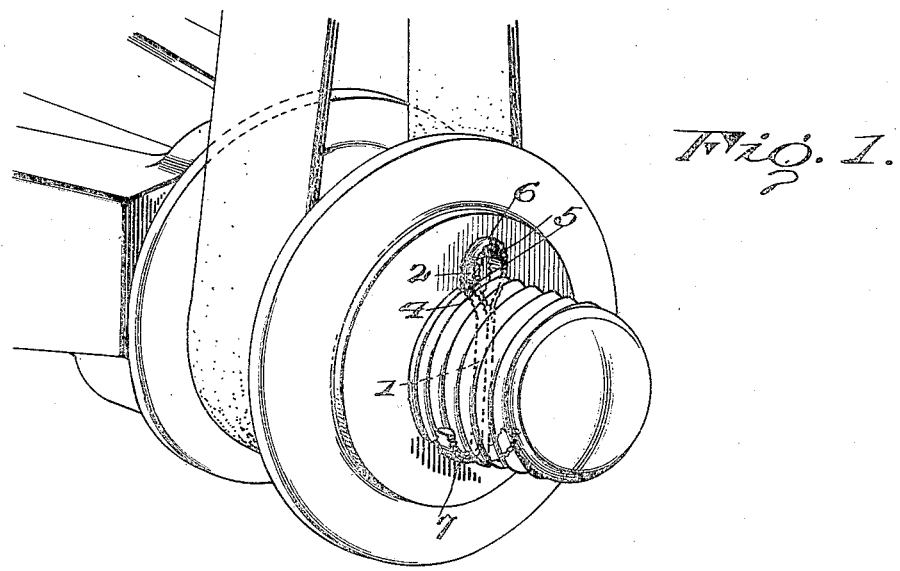
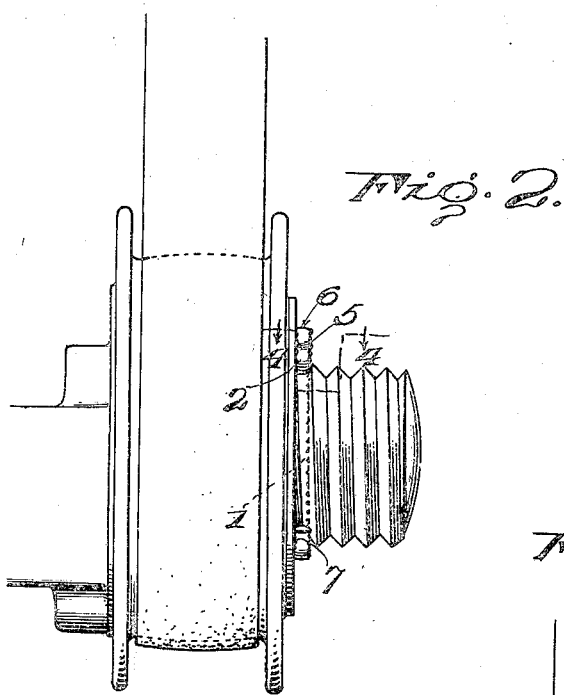
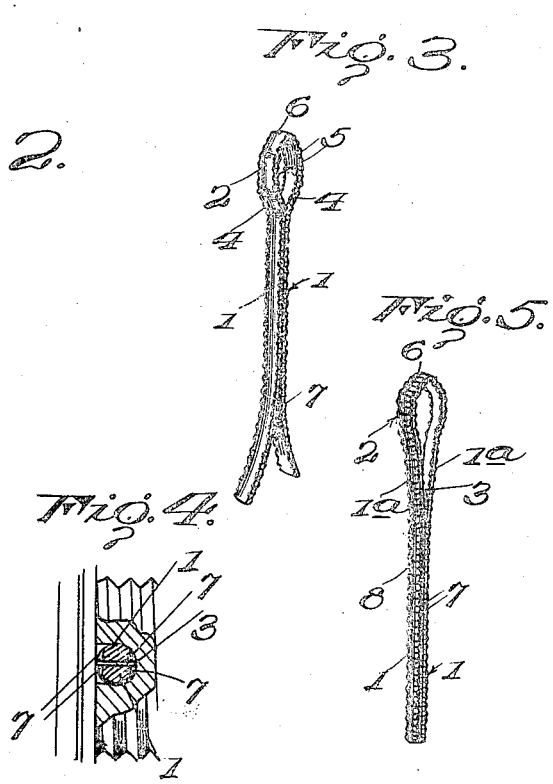
INVENTOR
B. J. Johnson.
BY
ATTORNEYS Patented Aug. 4, 1925.

1,548,688

UNITED STATES PATENT OFFICE.

BENNIE JOSEPH JOHNSON, OF BRIDGEPORT, CONNECTICUT.

COTTER PIN.

Application filed June 3, 1925. Serial No. 34,719.

*To all whom it may concern:*

Be it known that I, BENNIE J. JOHNSON, a citizen of the United States, residing at Bridgeport, in the county of Fairfield, State of Connecticut, have invented certain new and useful Improvements in Cotter Pins, of which the following is a specification.

This invention relates to an improvement in cotter pins and aims to provide a device of this character which has all the advantages of the conventional cotter pin but which facilitates the insertion and removal of the pin and enhances the locking or securing action.

A further object resides in the provision of a cotter pin having these advantages and capacities and which is of extremely simple and durable construction, reliable and effective in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a fragmentary perspective view showing the cotter pin in use in holding a pulley on a shaft, Figure 2 is a view thereof in side elevation, Figure 3 is a detail perspective view of one form of the cotter pin, Figure 4 is a view in section on the line 4—4 of Figure 2, and Figure 5 is a view showing a slightly modified form of cotter pin.

Referring to the drawings it will be seen that the cotter pin in all embodiments of the invention includes a pair of legs 1 and a head or connecting portion 2. The confronting faces of the legs have faces 3 designed to flatly contact with each other. The cotter pin is constructed of resilient metal which is bendable and possesses the other properties of the ordinary cotter pin and the cotter pin is formed and tensioned so that the legs 1 have their forward ends engaged as shown in Fig. 5. The portions of the legs 1 adjacent the head are designated at 1ª and these portions incline or converge from each other toward the head. At the juncture of the inclined portions 1ª and the head outwardly inclined shoulders 4 are provided and these shoulders merge into the flat parallel sides 5 of the head. The sides 5 are preferably long to provide flat and elongated gripping surfaces and the crown of the head is rounded or slightly angled as indicated at 6.

With this arrangement the cotter pin may be easily introduced into the opening in the shaft or bolt section. The forward ends of the legs have the flat confronting faces 3 engaged with each other. When the cotter pin is driven home the outwardly inclined shoulders 4 will engage in the walls of the opening in the bolt or shaft to bring the inclined portions 1ª of the legs together and spread the forward ends of the legs slightly to facilitate the outward bending with pliers or other tool so that the cotter pin may be held in position in the usual way, as shown in Figs. 1 and 2. The outward spreading movement imparted to the forward ends of the legs by the co-action of the shoulders 4 and the walls of the opening of the bolt shaft is exaggerated in Fig. 3 for the sake of illustration.

As shown in Fig. 3 the edges of each leg and of the head may be knurled or formed with serrations 7 throughout their extent and in addition to the serrations 7 on the edges, serrations 8 may be formed on the outer sides or faces of the legs and head, as indicated in Fig. 5. These serrations not only enhance the locking action but also facilitate the gripping of the head and legs with a pliers or other tool and effectively prevent slipping of the pliers off of the legs or head.

I claim:

1. A cotter pin having legs provided with confronting surfaces adapted to flatly engage each other and having serrations along its edges to enhance the locking action and to facilitate gripping of the parts of the cotter pin with the tool.

2. A cotter pin having legs provided with confronting surfaces adapted to flatly engage each other and having serrations along its edges and across its outer surfaces to enhance the locking action and to facilitate gripping of the parts of the cotter pin with the tool.

3. A cotter pin having a head and legs, the legs being straight and having flat confronting surfaces adapted to flatly engage each other, the legs and head having serrations throughout the entire length of the pin to enhance the locking action and to prevent slipping of the pliers or other tool off of the head or legs when manipulating the cotter pin.

BENNIE JOSEPH JOHNSON.